Sept. 15, 1953 W. A. WILLIAMS 2,652,316
LIQUID-LIQUID CONTACTING APPARATUS
Filed April 27, 1951

William A. Williams Inventor
By W. O. J. Heilman Attorney

Patented Sept. 15, 1953

2,652,316

UNITED STATES PATENT OFFICE 2,652,316

LIQUID-LIQUID CONTACTING APPARATUS

William A. Williams, Sarnia, Lambton, Ontario, Canada, assignor to Standard Oil Development Company, a corporation of Delaware Application April 27, 1951, Serial No. 223,183

4 Claims. (Cl. 23—270.5)

This invention concerns novel apparatus for the contacting of two substantially immiscible or partly miscible liquids as conducted in processes such as solvent extraction operations. The apparatus of this invention is well adapted for the efficient contacting of liquids in any liquid-liquid system. The novelty of the apparatus herein disclosed and claimed resides in the arrangement of the perforated plate members, trays, and baffles provided in a vertical contacting tower by means of which effective contacting is achieved. A particular point of novelty of this apparatus is the means by which the size of perforations employed is adjusted to optimum proportions for the contacting of any particular liquids.

The invention is directed broadly to processes in which liquids are treated with selective solvents. At the present time there are a great many chemical processes in which a selective solvent is used to treat a particular liquid in order to secure a partial segregation, or removal of chemical constituents of the liquid. For example, petroleum oils are conventionally treated with solvents such as liquid sulfur dioxide, phenol, creosote, nitrobenzene, furfural, aniline, ether and other solvents or mixture of such solvents. Solvents of this nature are used to treat petroleum oils in order to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired; for example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types, some employing various types of packing materials, others employing bubble cap plates, and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50%. By plate efficiency as that term is used, it is meant that each plate is effective in accomplishing a percentage contacting efficiency of the contact achieved at equilibrium in a single batch stage mixer and settler. Thus one theoretical stage is established by contacting two liquids intimately in a batch mixer followed by a thorough settling in a batch settler. As stated, therefore, conventional pierced plate liquid contacting towers have relatively low plate efficiencies. It is clearly of the greatest importance to improve the plate efficiency of the types of pierced plates used in such towers in order to decrease the expense of the contacting and to decrease the size of the towers necessary. It is, therefore, the principal object of this invention to provide an improved type of pierced plate extraction tower in which the plate efficiencies are substantially greater than that obtainable in conventional towers.

In analyzing the mechanism of liquid-liquid contacting, it is apparent that two basic effects are required. These are efficient mixing of the liquids followed by efficient separation of the mixed liquids. Thus in extraction towers having a given number of plates, for best efficiency it is necessary that each plate, or set of plates, provide good mixing and provide good settling. Only by achieving both of these desiderata in such a tower is it possible to secure many theoretical stages. Conversely considering any one extraction plate, such a plate can only have a high plate efficiency if the plate is capable of both thoroughly mixing and thoroughly separating the mixed liquids. It is, therefore, a further and more particular object of this invention to provide a type of pierced plate which will most effectively be capable of thoroughly mixing and thoroughly settling liquid phases passing through the plate.

In developing a particular pierced plate design for contacting a given liquid-liquid system, it is necessary to secure certain basic data as to the mixing and settling characteristics of the liquid concerned. For example, certain liquids may be very readily mixed, but when mixed are difficult to separate. Alternatively, other types of liquids are difficult to mix but may be readily separated. As a result of this factor extraction towers known to the prior art have been of different types depending upon the particular liquid-liquid system to be contacted. One of the objects of this invention is to provide plates for use in an extraction tower which may be readily adjusted for any liquid-liquid system to provide the necessary mixing and settling to meet the particular characteristics of the liquids to be treated. Thus the plates of the extraction tower of the present invention are adapted to the contacting of two liquids which are easy to mix but hard to separate, such as phenol and oil, or to the contacting of two liquids which are difficult to mix but easy to separate such as caustic solutions and oil.

In accordance with these objectives, a novel contacting tower is provided enabling the efficient mixing of liquids to be contacted by bringing the liquids together as jets after being forced through perforations. The perforations employed are so provided in the apparatus that the size of the perforations may readily be controlled or adjusted to provide the degree of mixing required for any particular liquid-liquid system. After contact of the two liquid jets, the liquids are caused to flow into an enlarged unobstructed portion of the tower permitting effective settling of the mixed liquids. After the liquids have separated in this zone, the separated liquids may then be passed to subsequent contacting zones in the tower. The nature of this invention may be understood from consideration of the accompanying drawings, illustrating a preferred embodiment of this invention.

In these drawings.

Figure 2:
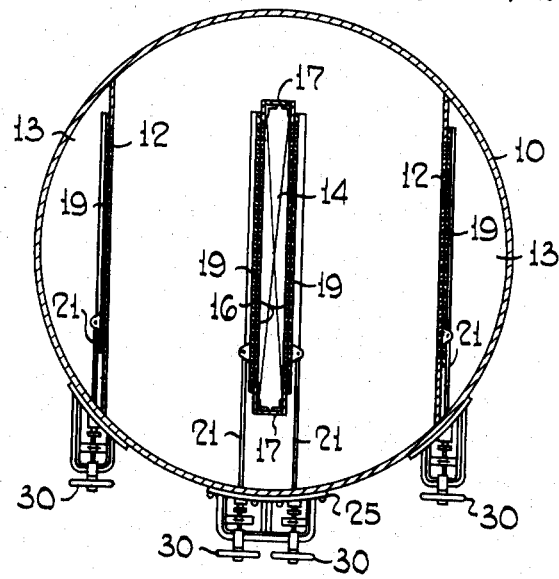
Figure 2 is a transverse section taken on the line II—II of Figure 1.
Figure 3:
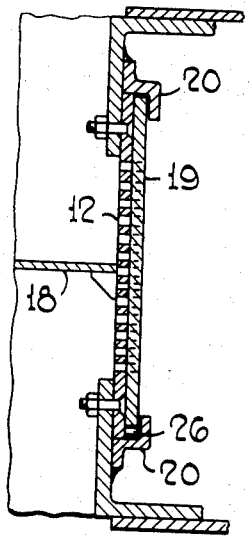
Figure 3 is an enlarged section showing the gate disposed in a sliding engagement in the guides and superimposed on the fixed, perforated plate.
Figure 1:
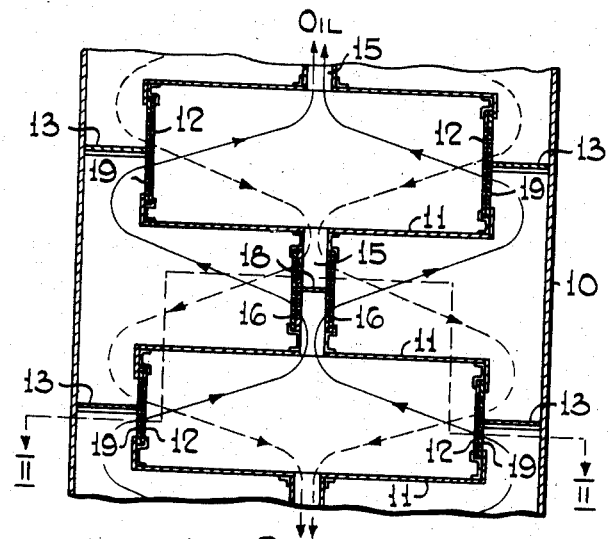
Figure 1 is a part-sectional elevation of the tower showing the general arrangement of the structure and the counter-current movement of the liquids being contacted.

Referring in detail to the drawing, the numeral 10 designates a phenol treating tower in which is provided a plurality of trays 11 with perforated plates 12 attached thereto as shown in Figure 1 and Figure 2. Segmental baffle plates 13 and 18 divert the current of phenol and oil through the perforated plates 12. A rectangular opening 14 is provided in adjacent trays providing a rectangular passage 15 formed between two perforated plates 16 and two solid end plates 17. A baffle plate 18 diverts the flow of phenol and oil through the perforated plates 16.

Figure 4:
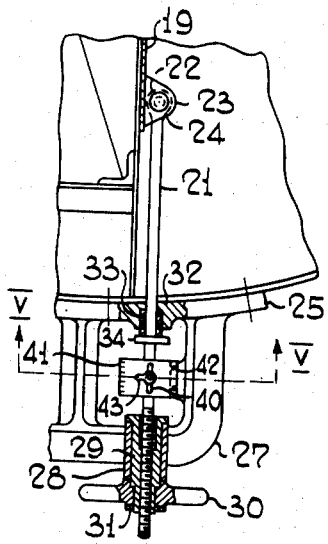
Figure 4 is a plan view showing the gate-actuating mechanism and the position indicator.

Gate plates 19 are superimposed on plates 12 and 16 and have the same size and spacing of openings. The gate plates 19 are slidably mounted in guide members 20 secured to the structure by welding or in any other approved manner. A plurality of anti-friction rollers 26 are placed in semi-circular cut-outs in the lower edge of the plate 19. The gate plates are adjustable independently of each other so that the orifice size may be varied from zero to maximum depending upon the degree of mixing desired in the various parts of the tower. It is preferred to carry out this feature of this invention in the manner as shown in Figure 4 where it will be seen that the gates 19 may be adjusted to any degree desired by means of a spindle 21 which terminates at its inner end in a head portion 22 mounted between lugs 23 by means of a bolt 24. The lugs may be secured to the gates 19 by welding or the like. The adjusting assembly, comprising a flange portion 25 and a yoke portion 27 is secured to the shell 10 of the tower. The yoke portion as shown is formed of two or more webbed arms of which two are opposed. The arms terminate in a collar portion 28. A sleeve 29 inserted in the yoke collar is flanged at its lower end and internally threaded. The sleeve 29 extending outward beyond the collar, has a shouldered portion on which is carried a hand wheel 30. The hand wheel is keyed to the sleeve and held in place by a nut 31 threaded on the sleeve end. Surrounding the spindle 21 is a packing material 32 which fills the stuffing box 33 and is held in place by a gland member 34 which may be forced against the packing.

Figure 5:
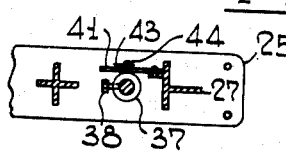
Figure 5 is a section taken along the line of Figure 4 showing the arrangement of the scales and indicator pointers.

It is imperative that the precise position of the gates 19 should be transmitted to the operator of the unit. This feature of the invention is carried out in the manner shown in Figures 4 and 5, where it will be seen that the indicator sleeve 37 has been secured to spindle 21 by means of a set screw 38. The sleeve has been formed with a rectangular portion slidingly fitted in a slot 40 provided in the graduated scale 41. The scale is secured to the yoke arm 27 by means of screws 42. The indicator pointers are secured to the rectangular portion of sleeve 37 by screws 44.

In employing the apparatus illustrated and described, the lighter of two liquids to be contacted is introduced to the bottom of a tower containing the contacting elements shown in the drawings. The heavier of the two liquids to be contacted is introduced at the top of the tower. For example, in the contacting of lubricating oil with phenol, phenol would be introduced at the top of the tower while oil would be introduced at the bottom of the tower. Referring particularly to Figure 1 of the drawings, the oil will tend to follow the paths shown by the full lines, while the phenol will follow the paths shown by the dashed lines. Thus, oil will rise upwardly to flow around a lower tray 11 adjacent the wall of the tower 10. This upward flow is obstructed by the horizontal baffles 13 adjacent the perforations provided in the vertical perforated plates 19. The oil will thus be forced through these perforations in the form of a large number of constricted streams. Phenol flowing downwardly about an upper tray 11 adjacent the wall 10 of the tower will similarly be directed through perforations of perforate member 19, due to the obstruction to flow imposed by baffle 13. Again, the phenol will be jetted through the perforations.

The jets of oil will be directed inwardly and, by virtue of the lighter gravity of the oil with respect to phenol also present, the oil jets will also be directed upwardly along the path indicated. Phenol will be jetted inwardly and downwardly. Consequently, the jets of phenol and oil will flow in a converging concurrent manner to permit the effective liquid-liquid contacting of the phenol and oil jets.

As a result of the contact of the phenol and oil jets, an unstable dispersion of oil in phenol or of phenol in oil will be formed between pairs of trays 11 and adjacent the perforate member 19. This dispersion will flow towards the central part of the tower. In this portion of the tower, an oil phase will separate adjacent the lower portion of an upper tray 11 while a phenol phase will separate on the upper side of a lower plate 11. In a manner similar to that described, the phenol and oil phases will then pass downwardly and upwardly respectively through the central downcomer provided between the pairs of perforate members 16 and 16. Baffle 18 preventing any clear vertical passageway through these downcomers, forces the liquid streams through the perforations of the perforate members. Again, therefore, the phenol and oil are jetted through perforations above and below the baffle 18 to be recontacted adjacent the perforate member 12. The mixed liquids are then caused to flow toward the wall of vessel 10, separating to flow upwardly and downwardly through successive stages of contacting.

In accordance with the principles discussed herein, the size of the perforations in each of the perforate members is critically adjusted by operation of the hand wheels 30 and by reference to the indicator 41 and pointer 43. Thus, in the event the liquids to be contacted are of the nature which are easy to mix but difficult to separate, the mixing will be minimized by operating the hand wheels 30 to cause full register of the perforations of each of the paired perforate members. However, in the event the liquids are of the nature which are difficult to mix, but easy to separate, hand wheels 30 will be operated to reduce the effective openings through the perforate members so that liquid forced therethrough will be in the form of fine jets of high velocity, causing better mixing. It is apparent that by this means, optimum liquid-liquid contacting may be achieved in any liquid-liquid system with full compensation for variations in viscosity, density, and the other contacting factors.

The preferred embodiment of this invention has been described in conjunction with what is known as a "double pass" tray arrangement.

Thus, two countercurrently moving streams of liquid may move through the tower having a common passage through the central rectangular passageway 15. It is apparent that a single pass tower may also be employed to embody this invention. For example, referring to Figure 1, the shell of tower 10 may terminate at a point essentially bisecting the center of the apparatus illustrated. Or stating it differently, if a vertically positioned baffle be positioned to bisect the tower through the principal dimension of openings 14 and passageways 15, then apparatus of Figure 1 may be converted to two single pass towers. It is to be understood therefore that these and other modifications may be made within the scope of this invention.

What is claimed is:

1. A liquid-liquid contacting apparatus comprising a vertical tower, a plurality of horizontally disposed vertically spaced imperforate partition members positioned throughout said tower, each of said partition members terminating at points spaced from opposite sides of the tower, vertically positioned perforated plate elements fixed to adjacent pairs of partition members at the terminations of said partition members at both sides of the tower forming vertical conduits between said tower and said plate elements, horizontal baffle means positioned in and blocking the median portion of said conduits, and a second set of perforated plate elements fixed to said paired partition members at a central portion of said partition members forming a central vertical conduit between adjacent paired pairs of partition members, and horizontal baffle means positioned in and blocking the median portion of said central vertical conduit.

2. The apparatus defined by claim 1 in which one of said perforate members is fixed to a shaft extending externally of the tower, and means are positioned on said shaft adapted to control movement of said perforate member.

3. The apparatus defined by claim 1 in which said perforated vertical plate elements comprise a pair of perforate plate members maintained in sliding juxtaposition including means to vary the register of the perforations in the said pair of perforate members.

4. The apparatus defined by claim 2 in which said shaft includes indicator means to exhibit variations in the register of the perforations.

WILLIAM A. WILLIAMS.

References Cited in the file of this patent

UNITED STATES PATENTS

| Number | Name | Date |
|---|---|---|
| 1,718,714 | Link et al. | Jan. 25, 1929 |
| 2,271,462 | Pfenning | Jan. 27, 1942 |
| 2,274,030 | Atkins | Feb. 24, 1942 |
| 2,460,019 | Long et al. | Jan. 25, 1949 |